(12) United States Patent
Wright et al.

(10) Patent No.: US 7,959,804 B2
(45) Date of Patent: Jun. 14, 2011

(54) USE OF NON-METALLIC LOAD DEVICES IN LIQUID FILTERS

(75) Inventors: Allen Buhr Wright, Hope Mills, NC (US); L. Steven Cline, Fayetteville, NC (US)

(73) Assignee: Purolator Filters NA LLC, Fayetteville, NC (US)

( * ) Notice: Subject to any disclaimer, the term of this patent is extended or adjusted under 35 U.S.C. 154(b) by 1167 days.

(21) Appl. No.: 11/612,205

(22) Filed: Dec. 18, 2006

(65) Prior Publication Data

US 2008/0142427 A1      Jun. 19, 2008

(51) Int. Cl.
*B01D 27/08* (2006.01)
*B01D 27/00* (2006.01)

(52) U.S. Cl. .. 210/232; 210/457; 210/443; 210/DIG. 17

(58) Field of Classification Search ................... 210/232, 210/457, 443, 444, DIG. 17
See application file for complete search history.

(56) References Cited

U.S. PATENT DOCUMENTS

| | | | |
|---|---|---|---|
| 3,567,023 A | | 3/1971 | Buckman et al. |
| 5,772,881 A | * | 6/1998 | Stockhowe et al. ........... 210/440 |

FOREIGN PATENT DOCUMENTS

| | | | |
|---|---|---|---|
| DE | 4140140 A1 | * | 6/1993 |
| GB | 982466 | * | 2/1965 |
| GB | 1450395 A | * | 9/1976 |
| GB | 2056873 A | * | 3/1981 |
| JP | 8-290014 A | | 11/1996 |

OTHER PUBLICATIONS

European Search Report dated Apr. 3, 2008 in corresponding European case.
Most recently filed Reply, dated Jul. 14, 2010, for U.S. Appl. No. 11/409,573.
Most recently filed Reply, dated Jun. 1, 2010, for U.S. Appl. No. 11/410,122.
Most recently filed Reply, dated Dec. 3, 2010, for U.S. Appl. No. 11/410,122.

\* cited by examiner

*Primary Examiner* — Thomas M Lithgow
(74) *Attorney, Agent, or Firm* — Crowell & Moring LLP

(57) ABSTRACT

A filter media includes a media pack having a central opening that extends between opposing ends of the media pack. A support member, such as a center tube, extends through the central opening and supports one of the opposing ends. A second support member, such as a guide, is secured to the second support member and supports the other of the opposing ends. The guide loads the components within the filter to provide desired sealing. The guide is provided by flexible plastic tabs in one example and by an elastomeric grommet in another example.

8 Claims, 7 Drawing Sheets

USE OF NON-METALLIC LOAD DEVICES IN LIQUID FILTERS

BACKGROUND OF THE INVENTION

This invention relates to a center tube and a guide for a filter that together form a filter cartridge assembly. More specifically, the invention relates to the guide that provides one end of the filter cartridge assembly while providing the load device that locates the filter cartridge assembly within the filter housing.

A typical filter includes a filter cartridge assembly having a media pack. The media pack typically includes a filter media arranged between opposing end discs. A center tube is arranged between the end discs within a central opening provided by the filter media to prevent the filter media from collapsing as fluid flows from an inlet side of the filter media toward the central opening to an outlet side. A guide is separately arranged between one of the end discs and the filter housing. The guide loads and locates the filter cartridge assembly within the filter housing for proper sealing.

The guide is typically a metallic coil spring or leaf spring and is difficult to handle during assembly. The guide biases the filter cartridge assembly toward a tapping plate, which is used to secure the filter to a mounting block. If the guide is improperly installed, then internal leaks and rattling of loose parts within the filter may result. It is also desirable to reduce the amount of metal within the filter to improve recyclability. What is needed is a non-metallic guide that is easier to assemble properly.

SUMMARY OF THE INVENTION

A filter media includes a media pack having a central opening that extends between opposing ends of the media pack. A support member, such as a center tube, extends through the central opening and supports one of the opposing ends. A second support member, such as a guide, is secured to the second support member and supports the other of the opposing ends. The guide loads the components within the filter to provide desired sealing. The guide is provided by flexible plastic tabs in one example and by an elastomeric grommet in another example.

The filter is assembled by inserting the center tube into the central opening, so that the seat of the center tube supports one end of the media pack. The guide is secured to the center tube with the interlocking connection to support the other end of the media pack. In the example shown, seals are arranged between the guide and center tube and a pocket pleated filter media to provide the filter cartridge assembly.

These and other features of the present invention can be best understood from the following specification and drawings, the following of which is a brief description.

DETAILED DESCRIPTION OF THE EXEMPLARY EMBODIMENTS

Figure 1:
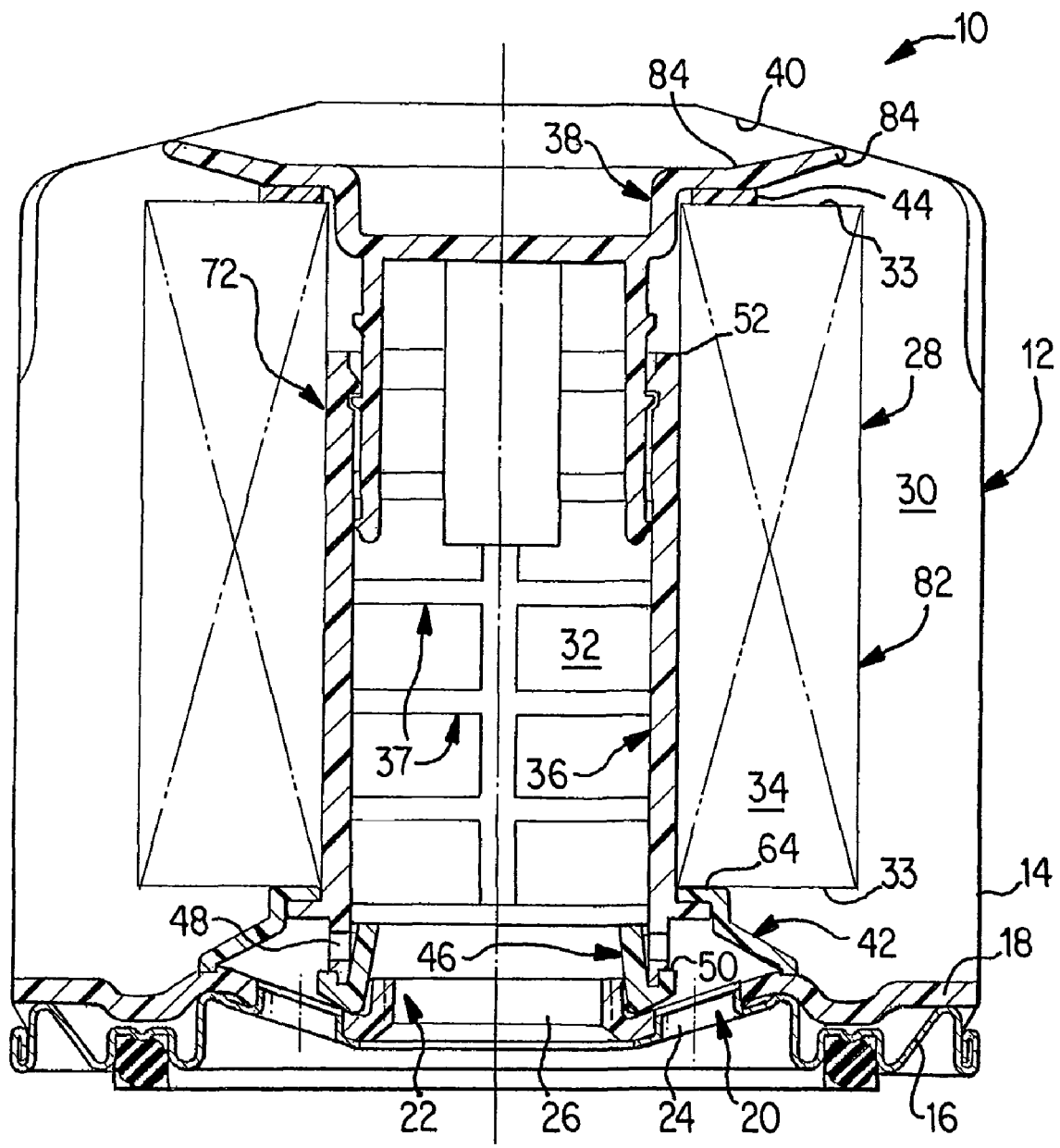
FIG. 1 is a cross-sectional view of a filter using the example adjustable cartridge assembly arrangement.

A filter 10 is shown in FIG. 1 and is representative of a typical spin-on oil filter. The filter 10 includes a housing 12 having a can 14 that provides a cavity. A retainer 16 is secured to the can 14 to retain a tapping plate 18. The tapping plate 18 includes an inlet 20 provided by multiple apertures 24 arranged circumferentially about an outlet 22. The outlet 22 is provided by a threaded hole 26 that is used to secure the filter 10 to a mounting block (not shown).

A media pack 28 is arranged within the housing 12 to filter debris from the oil. Oil flows into the housing 12 through the inlet 20 to an inlet side 30 of the media pack 28. Oil passes through the media pack 28 and exits to an outlet side 35 and flows through the outlet 22.

Figure 2:
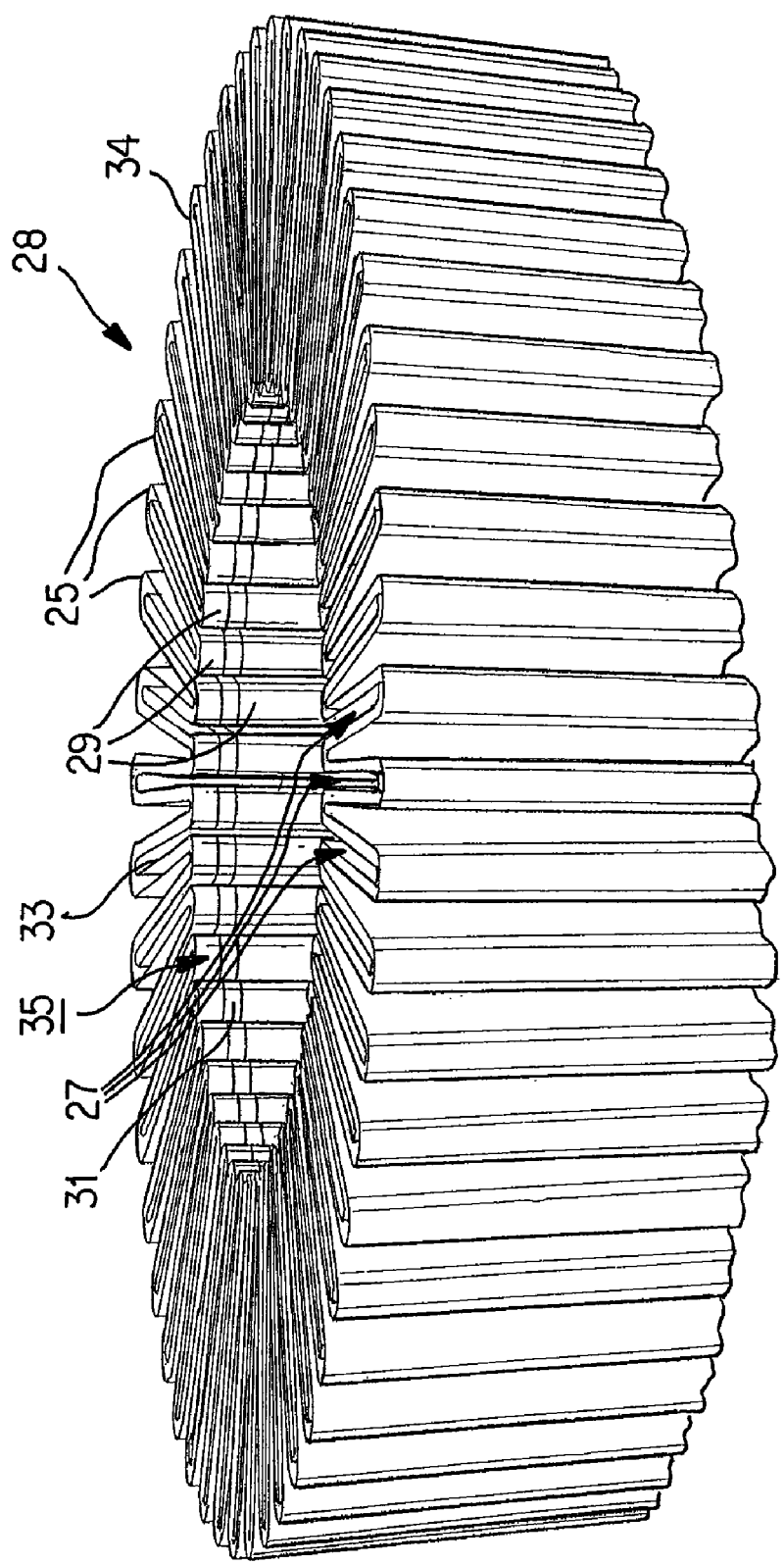
FIG. 2 is a perspective view of media pack used in the filter shown in FIG. 1.

The media pack 28 includes a filter media 34 for debris removal. The filter media 34 can be arranged between two end caps in a known manner (not shown). Alternatively, the media pack 28 may be provided using the filter media 34 arranged in a pocket-pleated arrangement, shown in FIG. 2. The filter media 34 includes pleats 25 arranged in pockets 27, as is known in the art. The pleats 25 are secured by beads of adhesive 31 near each of opposing ends 33, to form the pockets 27, so that the inner edges 29 are in close proximity to one another. The inner edges 29 provide a central opening 32 that extends between the ends 33. Using a filter media 34 of the type shown in FIG. 2 permits the elimination of end caps that are typically secured to the ends 33. Instead, flexible seals are arranged at the ends 33 and extend to the inner edges 29 to ensure that oil flows from the inlet side 30 to the outlet side 35 without bypassing the filter media 34.

Returning to FIG. 1, a center tube 36 is arranged within the central opening 32 to support the inner edges 29 so that the filter media 34 does not collapse inwardly under oil pressure. The center tube 36 is a unitary structure in the example shown and includes openings 37 that permit oil to flow through the center tube 36. A guide 38 is secured to the center tube 36 by an interlocking connection 72. The guide 38 engages a wall 40 of the housing 12 to position and load the components within the filter 10 as desired. To seal the filter media 34, a seal 44 is provided between the filter media 34 and the guide 38. The seal 44 may be separate from the guide 38 or co-molded or over-molded to the guide 38.

An anti-drainback valve 42 is arranged between the other end 33 and the center tube 36 to provide a seal. The anti-drainback valve 42 may be separate from the center tube 36 or co-molded or over-molded to the center tube 36. A relief valve 46 is supported by a first end 50 of the center tube 36 while an opposing second end 52 of the center tube provides interlocking features for the interlocking connection 72, in the example shown. The anti-drainback valve 42, seal 44 and relief valve 46 are constructed from suitable materials, such as elastomers, to provide an adequate seal between the adjacent components.

Figure 3:
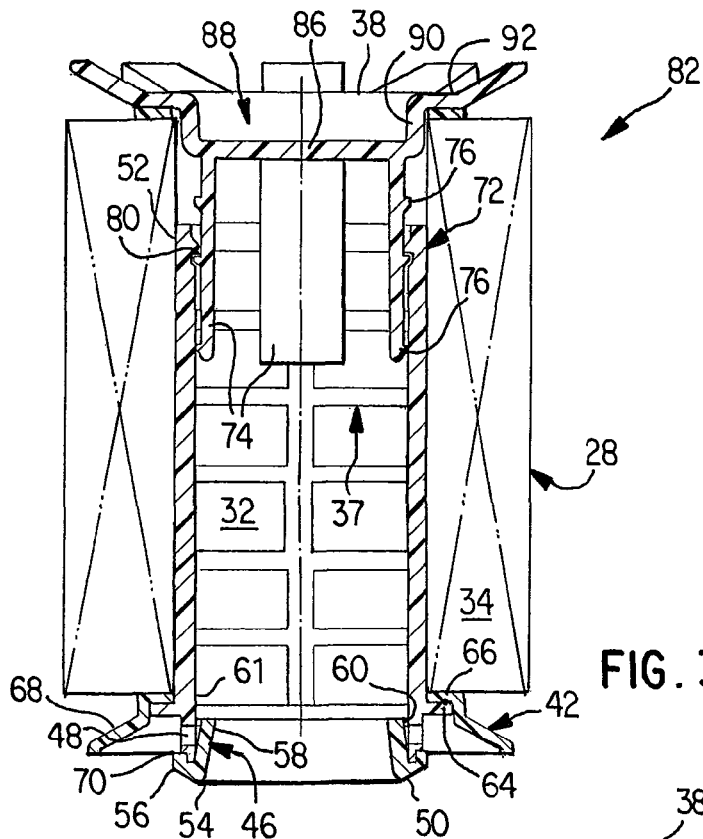
FIG. 3 is a cross-sectional view of the filter cartridge assembly shown in FIG. 1.

Referring to FIG. 3, the relief valve 46 includes a base 54 from which outer and inner legs 56 and 58 extend. A groove is arranged between the outer and inner legs 56 and 58 to provide a J-shaped cross-section. The inner leg 58 includes a lip 60 that engages an inner surface 61 of the center tube 36. The inner leg 58 blocks openings 48 in the center tube 36 when the relief valve 46 is in the closed position, which is shown in FIGS. 1 and 3.

The center tube 36 includes a seat 64 that extends radially outward from an axial body of the center tube 36. The anti-drainback valve 42 includes an annular flange 66 that is supported on, or molded to, the seat 64 and acts as a seal between the center tube 36 and the end 33 (FIG. 1). An intermediate portion 68 extends radially outward and toward the tapping plate 18 to an annular lip 70 that is in sealing engagement with the tapping plate 18 when the anti-drainback valve 42 is in a closed position, which is shown in FIG. 1.

The media pack 28, center tube 36, guide 38, seal 44 and anti-drainback valve 42 provide a filter cartridge assembly 82.

Figure 4B:
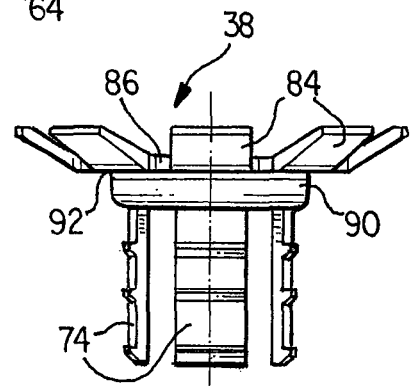
FIG. 4B is a side elevational view of the guide shown in FIG. 3.
Figure 4A:
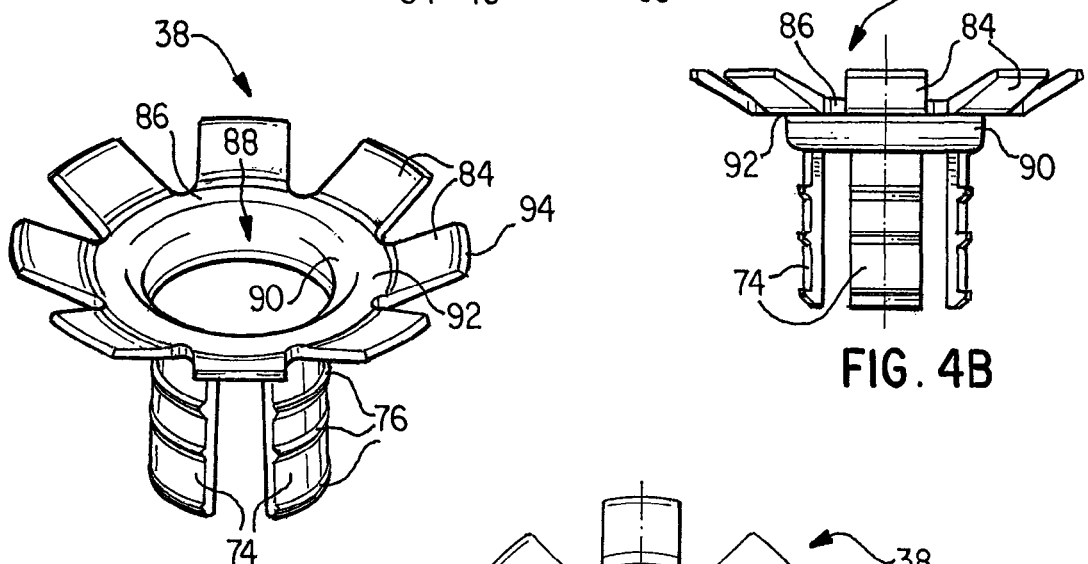
FIG. 4A is a perspective view of the guide shown in FIG. 3.
Figure 4C:
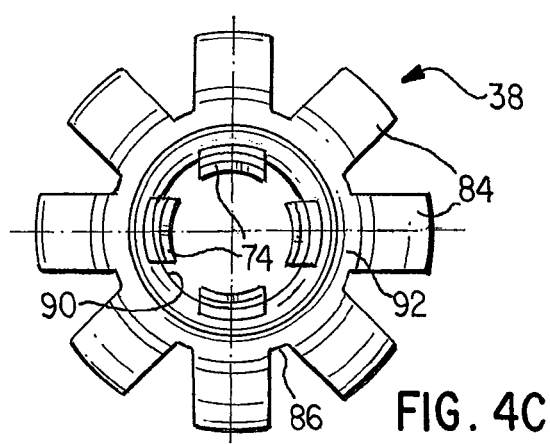
FIG. 4C is a top elevational view of the guide shown in FIG. 3.

In the example filter cartridge assembly 82 shown in FIG. 1, the guide 38 includes multiple flexible tabs 84 (eight in the example shown in FIGS. 4A-4C) that extend radially outwardly and upward to engage the wall 40 for ensuring that the filter cartridge assembly 82 is properly seated within the housing 12. The flexible tabs 84 extend to an engagement surface 94 that cooperates with wall 40 to bias the filter cartridge assembly 82 toward tapping plate 18 (see FIG. 1). The guide 38', shown in FIG. 5, uses a grommet 100 instead of the flexible tabs 84 to bias the filter cartridge assembly 82' within the housing.

Figure 9A:
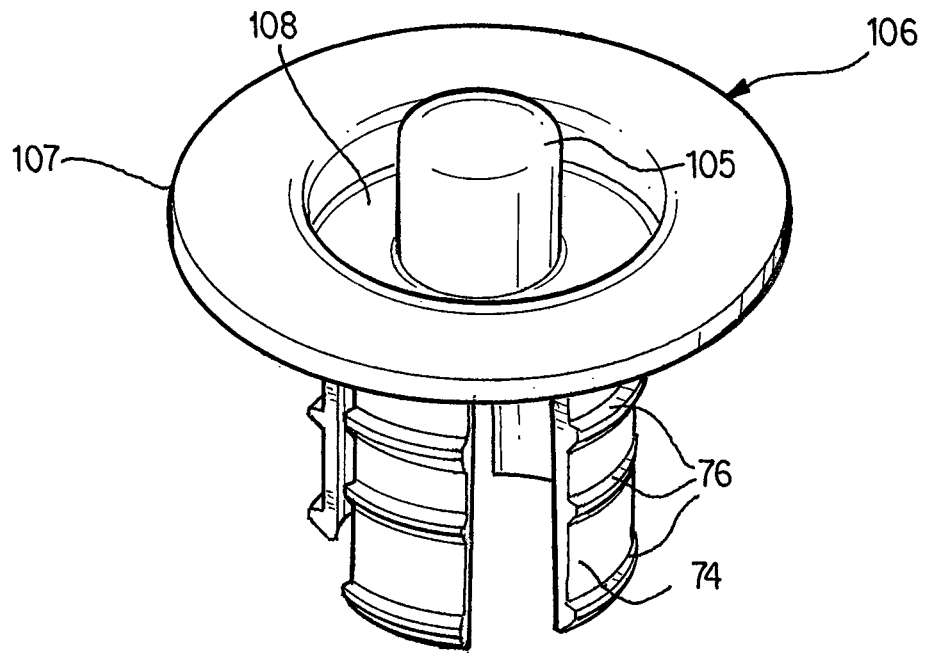
FIG. 9A is a perspective view of another embodiment of a guide and grommet, in accordance with the present invention.

FIG. 9A is a perspective view of another embodiment of a guide and grommet, in accordance with the present invention. As illustrated in FIG. 9A, a guide 106 includes a base 107 and a plurality of arms 74. The base 107 may include a recess 108. Each of the arms 74 may include a plurality of tapered barbs 76, which are used to secure the guide in a media pack. A grommet 105 may be disposed at an upper portion of the guide 106. As illustrated in FIG. 9A, a portion of the grommet may be disposed in the recess 108. The grommet 105 may be separate from the guide 106 or co-molded or over-molded to the guide 106, as further described below.

Figure 9B:
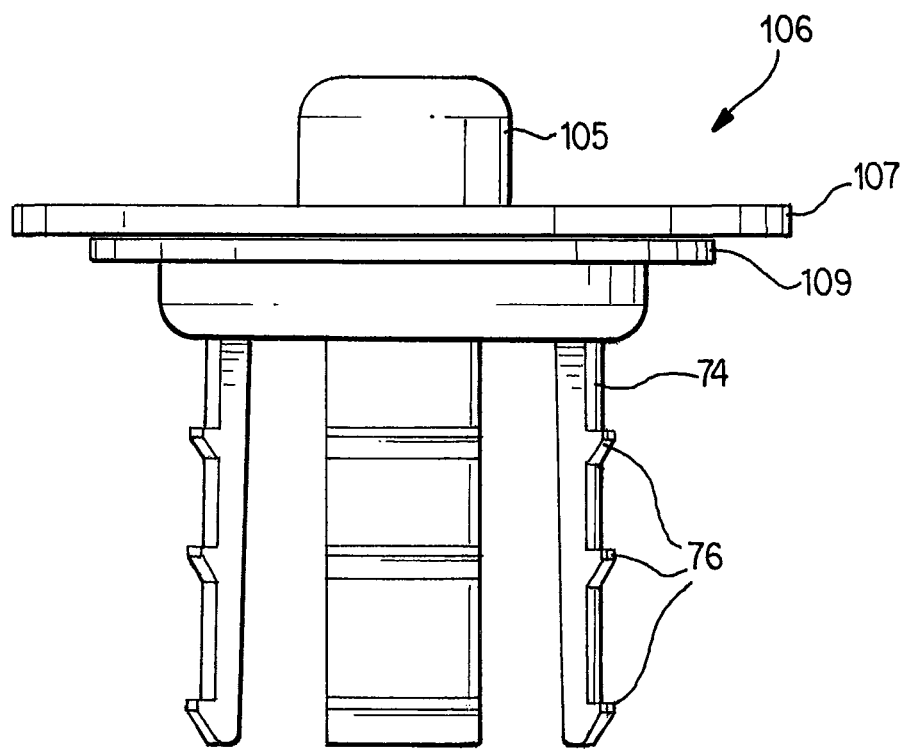
FIG. 9B is a side elevation view of the guide and grommet shown in FIG. 9A.

FIG. 9B is a side elevation view of the guide and grommet shown in FIG. 9A. As illustrated in FIG. 9B, a seal 109 may be included with the guide 106, either separately or co-molded or over-molded therewith, to form a sealing arrangement between the guide 106 and a filter media. The seal 109 is constructed from materials, such as elastomers, which are suitable for providing an adequate seal between adjacent components.

Figure 10:
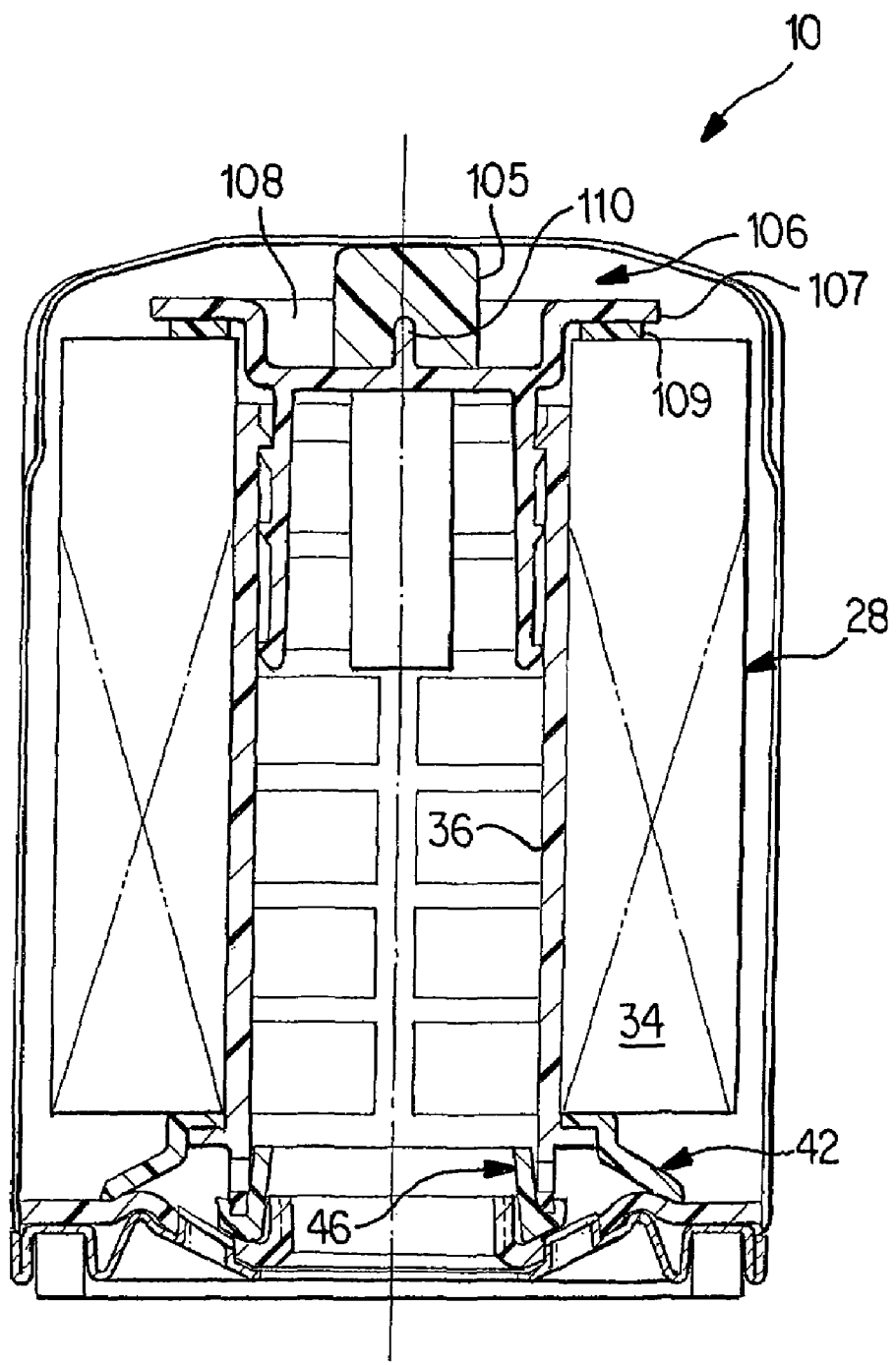
FIG. 10 a cross-sectional view of a filter having a filter cartridge assembly with the guide and grommet according to FIGS. 9A and 9B.

FIG. 10 is a cross-sectional view of a filter having a filter cartridge assembly with the guide and grommet according to FIGS. 9A and 9B. At a center portion of the grommet 105, a center protrusion 110 may be formed in the base, which extends upward from a center portion of the recess 108. As illustrated in FIG. 10, the guide 106 has a base 107, a recess 108 and a center protrusion 110. The grommet 105 is disposed on the center protrusion 110. A seal 109 provides a seal between the guide 106 and the filter media 34 of the media pack 28. The grommet 105 may be inserted into the guide 106 on the center protrusion 110, which maintains the positioning of the grommet 105 after installation. Alternatively, the grommet 105 may be co-molded or over-molded to the guide 105 at the center protrusion 110.

Referring to FIGS. 3, 4A-C and 7A-B, the guides 38 and 38' include a base 86 providing a recess 88 relative to an annular seat 92 that surrounds the base 86. An inner annular shoulder 90 interconnects the base 86 and seat 92 to radially locate the end 33 (FIG. 1). Flexible arms 74 extend downwardly from the base 86 into the central opening 32 to provide an interlocking feature that cooperates with the center tube 36. Each arm 74 includes multiple tapered barbs 76 that are axially spaced along the arm 74 to provide multiple assembly heights. Four arms 74 are provided on the example guides 38 and 38'.

The center tube 36 includes a tapered barb 80 (FIG. 3), which can be a continuous annular barb or several discrete barbs, on its inner surface 61 to provide an interlocking feature that cooperates with the guides 38 and 38'. The barbs 76 and 80 cooperate with one another to provide an interlocking connection 72 at a desired assembled height position. While barbs are shown in the example, other interlocking features may be provided. Moreover, the multiple, axially spaced barbs can be provided on the center tube 36 instead of or in addition to the multiple barbs 76 on each arm 74.

Figure 6:
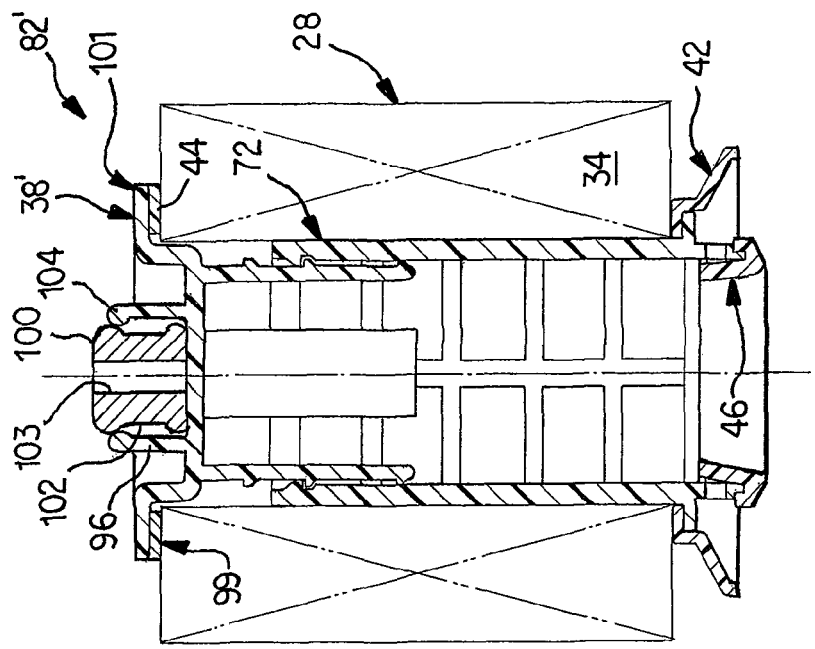
FIG. 6 is a cross-sectional view of the filter cartridge assembly shown in FIG. 5.
Figure 5:
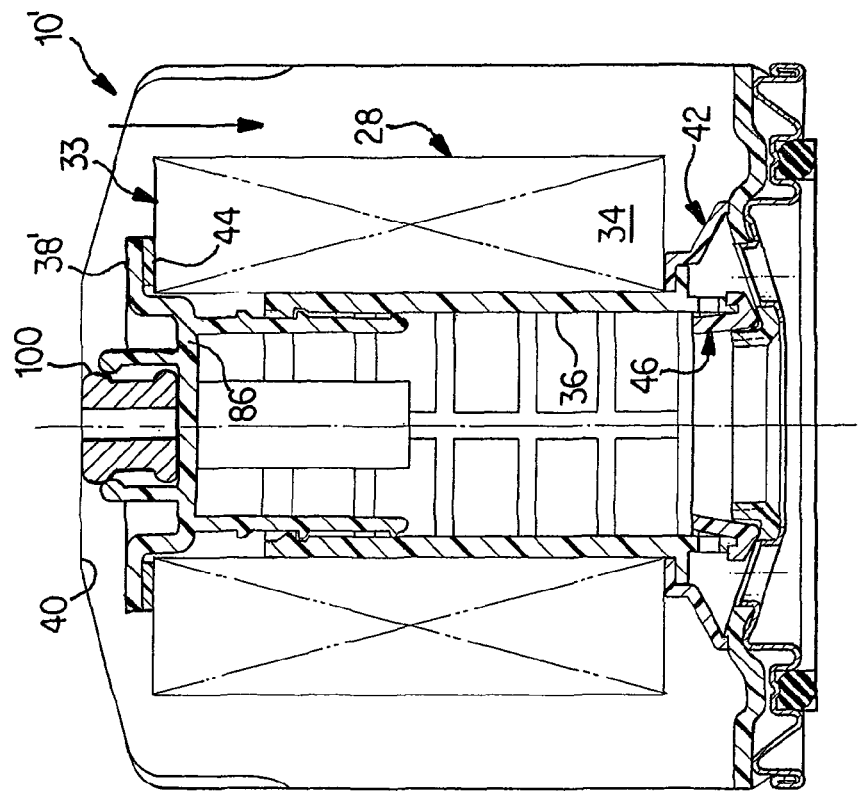
FIG. 5 is a cross-sectional view of the filter having another filter cartridge assembly.
Figure 7A:
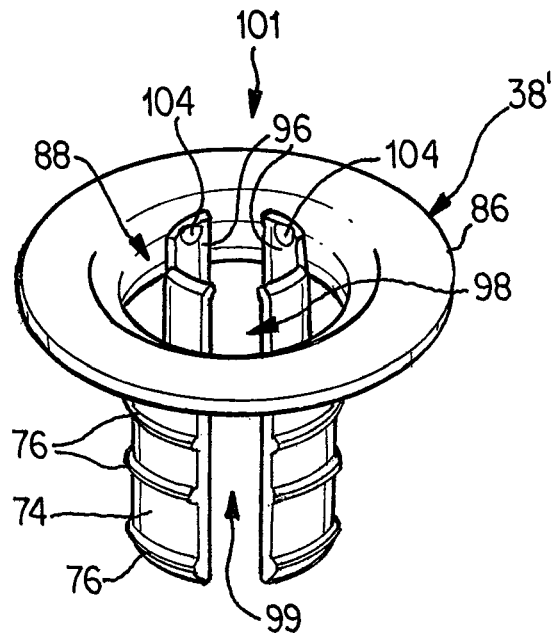
FIG. 7A is a perspective view of the guide shown in FIG. 6.
Figure 7B:
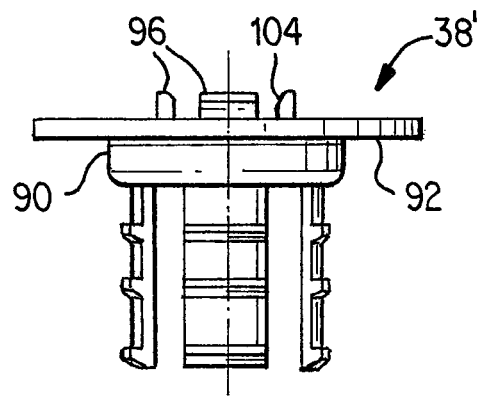
FIG. 7B is a side elevational view of the guide shown in FIG. 6.
Figure 8:
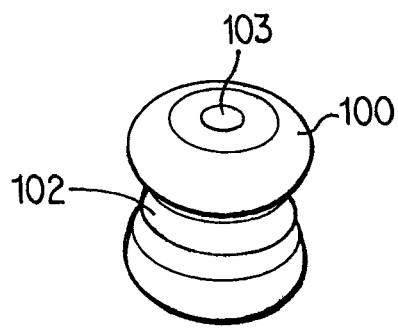
FIG. 8 is a perspective view of a grommet used in the filter cartridge assembly shown in FIG. 6.

Another example filter 10' and filter cartridge assembly 82' is shown in FIGS. 5 and 6. The filter cartridge assembly 82' includes legs 96 that extend from the base 86 to provide an opening 98 that receives a rubber grommet 100. Referring to FIGS. 6-8, the guide 38' includes a first side 99 that supports the seal 44, and an opposite second side 101 from which the legs 96 extend. The legs 96 include protrusions 104 that extend inward toward the opening 98 to retain the grommet. The grommet 100 includes a neck 102 with a smaller diameter than its end portions. A hole 103 extends between the end portions to permit the grommet to deflect during installation.

The filter 10 is relatively easy to assemble compared to prior art filter arrangements. First, the anti-drainback valve 42 is installed onto the center tube 36 so that the annular flange 66 is supported on the seat 64. Alternatively, the anti-drainback valve 42 can be glued or over-molded onto the center tube 36. The second end 52 of the center tube 36 is inserted into the central opening 32 of the media pack 28. The seal 44 is installed onto the guide 38. The guide 38 may be constructed from plastic. The seal 44 may also be glued to the guide 38 or over-molded onto it. The guide 38 is secured to the center tube 36 using the interlocking connection 72. The center tube 36 and guide 38 are loaded so that the anti-drainback valve 42 and seal 44 are in good sealing engagement with the opposing ends 33 of the media pack 28.

The relief valve 46 is installed onto the filter cartridge assembly 82 so that the first end 50 is seated in the groove of the relief valve 46. The filter cartridge assembly 82 is then inserted into the cavity provided by the can 14. The tapping plate 18 is secured to the can 14 using the retainer 16, as is well known in the art. The base 54 of the relief valve 46 seals against the tapping plate 18.

Although exemplary embodiments of this invention have been disclosed, a worker of ordinary skill in this art would recognize that certain modifications would come within the scope of this invention. For that reason, the following claims should be studied to determine the true scope and content of this invention.

What is claimed is:

1. A method of assembling a filter comprising the steps of:
   a) supporting a media pack with a guide to form a media pack assembly;
   b) inserting the media pack assembly into a housing;

c) engaging the housing with the guide; and
   wherein step c) includes deflecting a grommet located centrally on the guide, and
   wherein step a) includes arranging a seal between the media pack and the guide, inserting the grommet into an opening, and retaining the grommet with spaced apart legs that extend away from the media pack.

2. The method according to claim 1, wherein step a) includes securing a center tube to the guide within the media pack to form the media pack assembly.

3. The method according to claim 1, wherein step b) includes inserting an end of the media pack assembly with the guide first into the housing, and step c) includes engaging a closed end of the housing with the guide.

4. A filter comprising:
   a housing having a cavity;
   a media pack arranged in the cavity and having opposing ends;
   a guide including a first side supporting one of the opposing ends, and a second side opposite the first side that supports an elastomeric grommet, the elastomeric grommet flexing under engagement with the housing and generating a load on the media pack; and
   a seal axially arranged between the media pack and the guide;
   wherein the guide includes legs providing an opening that receives the grommet, the legs retaining the grommet.

5. The filter according to claim 4, wherein the guide and a center tube are secured to one another about the media pack to provide a filter cartridge assembly.

6. The filter according to claim 5, wherein the guide and a center tube are secured to one another by an interlocking arrangement.

7. The filter according to claim 5, wherein the filter cartridge assembly supports a valve providing a seal at opposite the guide, the guide biasing the seal into engagement with a tapping plate of the housing.

8. The filter according to claim 4, wherein the grommet is located at a central portion of the guide.

* * * * *